C. N. Brock,
Sugar Filter.
No. 66,293. Patented July 2, 1867.
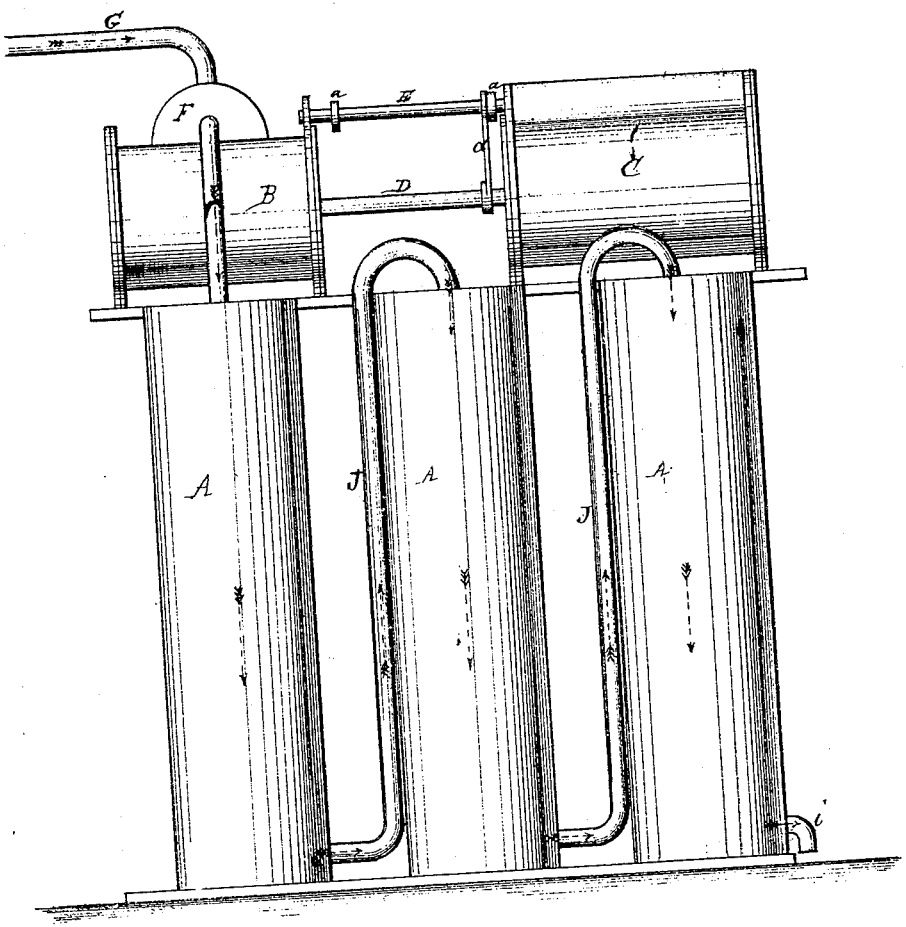
Witnesses
Wm. Frewin
F. Blockley
Inventor
Chas N. Brock
Per Munn & Co
Attorneys

United States Patent Office.

CHARLES N. BROCK, OF PHILADELPHIA, PENNSYLVANIA.

Letters Patent No. 66,293, dated July 2, 1867.

IMPROVED PRESSURE FILTER.

*The Schedule referred to in these Letters Patent and making part of the same.*

TO ALL WHOM IT MAY CONCERN:

Be it known that I, CHARLES N. BROCK, of the city and county of Philadelphia, and State of Pennsylvania, have invented a new and improved Pressure Filter; and I do hereby declare that the following is a full, clear, and exact description thereof, which will enable those skilled in the art to make and use the same, reference being had to the accompanying drawings, forming part of this specification.

This invention relates to a new and improved method of filtering and decolorizing sirup in the process of refining sugar; and it consists in passing the sirup through a battery or succession of closed filtering vessels under pressure as will be hereinafter described.

The drawing represents a side elevation of the arrangement.

Similar letters of reference indicate corresponding parts.

In this example of my invention only three filtering vessels are represented in the battery, but it will be obvious that they can be increased to any number corresponding with their strength and the amount of pressure applied.

A represents the filtering vessels, which are filled with bone-black or the filtering medium. B represents a force-pump which is driven by a steam engine or by power derived from any other source. The drawing represents an engine marked C. D is the piston-rod, with a piston for each cylinder (B and C) attached to it. E is a valve-rod, $a\ a$ are collars on the valve-rod, and $d$ is a tappet-arm attached to the piston-rod D. As the piston-rod moves back and forth the arm $d$ strikes the collars $a$, and thereby moves the valves and opens and closes the ports of the cylinder C. F is an air-chamber on the pump-cylinder B. G is a pipe which leads from the sirup reservoir, and discharges the sirup into the pump through a chest on the side, not seen in the drawing. H is a pipe through which the sirup is forced from the pump into the first filtering vessel. This pipe is also connected to the pump by a chest similar to the one on the opposite side for the supply pipe F. These chests are both provided with suitable ports and valves for the admission and discharge of the liquid. The course of the sirup as it is forced through the battery is indicated by the arrows. After being forced down through the filtering vessels it is forced from them upward through the connecting pipes J, and is discharged from the last vessel through the pipe $i$. This order may be reversed if desired, and the sirup be forced upward through the filtering vessels and downward through the pipes. The action of the force-pump will compress the air in the chamber F, which gives a pressure on the liquid in proportion to the power exerted.

What I claim, and desire to secure by Letters Patent, is—

The combination of a force-pump with a battery of filters, substantially as described, whereby I am enabled to use any desired number of filters in battery, thus filtering and decolorizing the sirup, whether the same be heated or not.

CHARLES N. BROCK.

Witnesses:
S. A. GIBBS,
THOS. F. BROCK.